April 20, 1937.    W. F. BORGERD ET AL    2,077,871

MILK REFRIGERATING CABINET

Filed Dec. 29, 1934    5 Sheets-Sheet 1

April 20, 1937.  W. F. BORGERD ET AL  2,077,871
MILK REFRIGERATING CABINET
Filed Dec. 29, 1934  5 Sheets—Sheet 2

Inventors
William F. Borgerd
Fred L. McCune
Charles A. Wherek
By V. F. Lavagne, Atty.

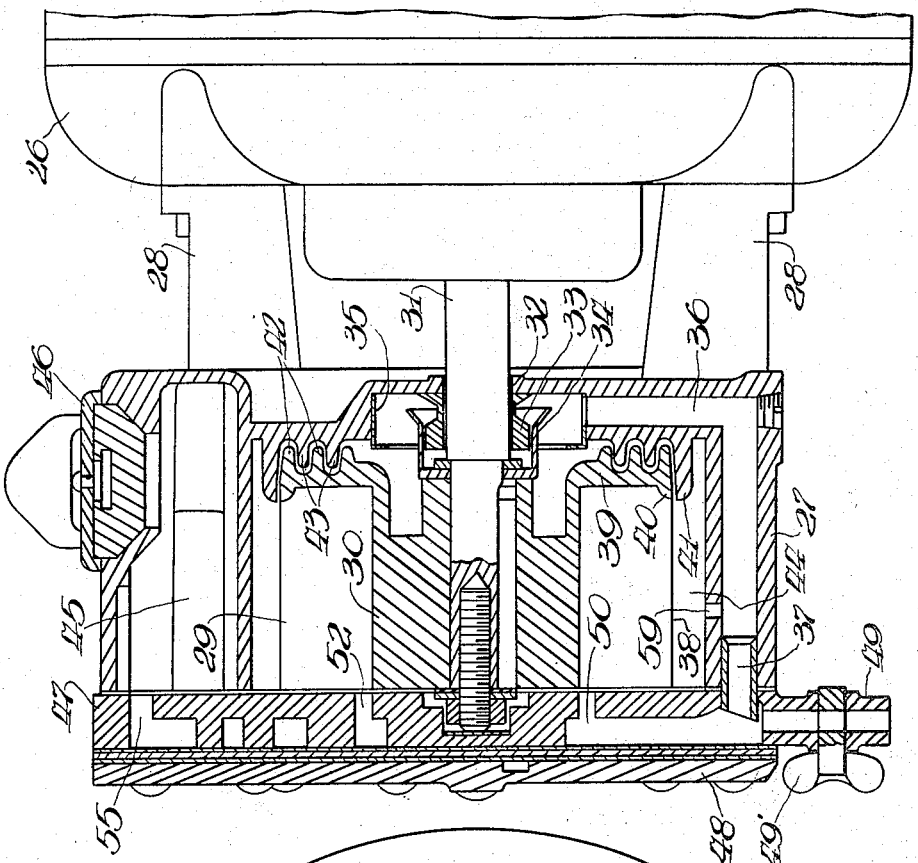

April 20, 1937. W. F. BORGERD ET AL 2,077,871
MILK REFRIGERATING CABINET
Filed Dec. 29, 1934 5 Sheets-Sheet 4

Inventors
William F. Borgerd
Fred L. McCune
Charles A. Wherek
By V. F. Lavagne
Atty.

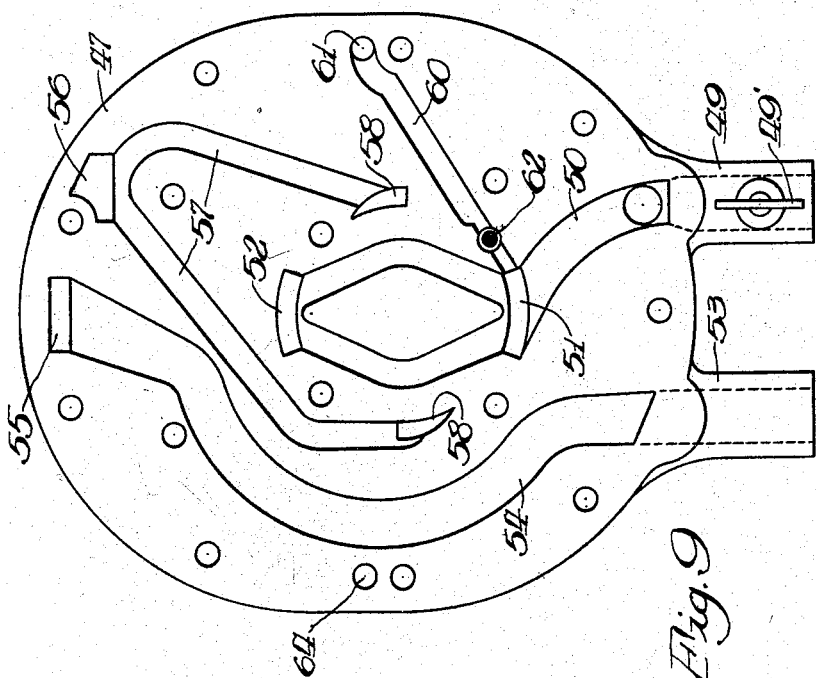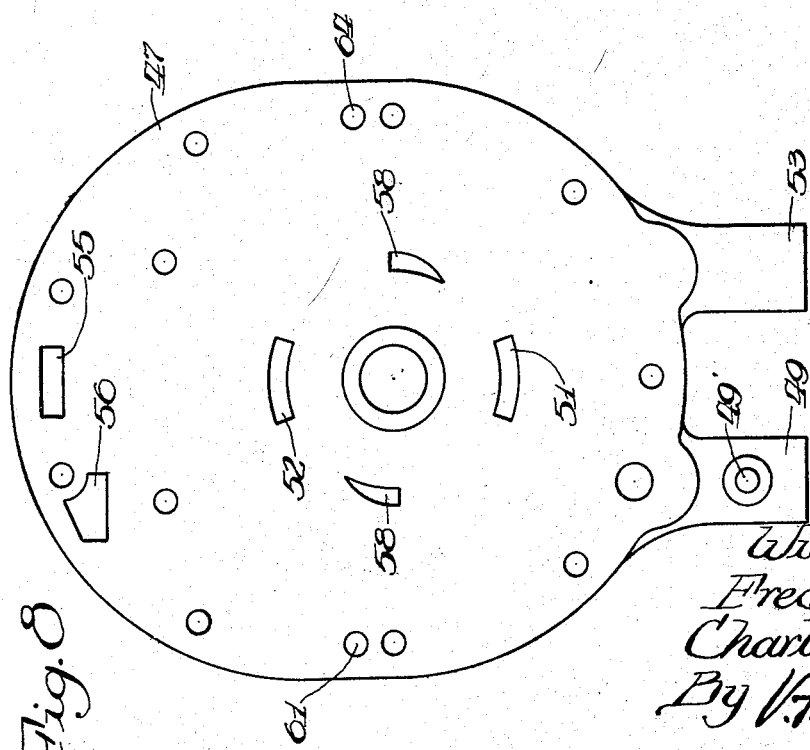

Patented Apr. 20, 1937

2,077,871

UNITED STATES PATENT OFFICE 2,077,871

MILK REFRIGERATING CABINET

William F. Borgerd, Riverside, and Fred L. McCune and Charles A. Uherek, Chicago, Ill., assignors to International Harvester Company, a corporation of New Jersey Application December 29, 1934, Serial No. 759,690

8 Claims. (Cl. 62—101)

This invention relates to a cooling device. More specifically, it relates to a milk cooling device including a cabinet, a refrigerating unit, and means cooperating with the unit and the cabinet to facilitate the heat exchange.

In the handling of milk, it is very desirable to cool the milk quickly to a temperature below that at which important bacterial action takes place, in order to improve the keeping quality and flavor of the milk. This step in the handling of milk is so desirable that in some milk producing areas laws have been made requiring the cooling of milk to a certain specified temperature within an hour's time after milking. The milk is usually placed in cans, after being preliminarily cooled, and then placed in liquid tanks to complete the cooling. There is a relatively large amount of heat in cans of milk of this size, and the rate of heat transfer is not rapid unless some form of agitation is resorted to, or unless a comparatively large heat differential is maintained. As the cooling is often done on a small farm, it is usually necessary to produce the refrigeration in a unit particularly designed for a milk cooler. By calculating the total amount of B. t. u.'s to be removed from the milk in the given length of time, the amount of refrigeration and the size of unit required can readily be determined. It is obvious that, if the refrigeration is to be done in a very short length of time, a large unit is required.

It is to solve some of the above problems in a commercially feasible manner that the present milk cooling device has been designed and constructed.

The principal object of the present invention is to construct and operate a milk cooling device utilizing a comparatively small refrigerating unit, yet being capable of extracting a large amount of heat over a short period of time. A more specific part of this object is to provide a refrigerating unit capable of building up an ice bank of accumulated refrigeration during a stand-by period of operation, and to provide means for rapidly transferring heat from the container to be cooled to the ice bank.

Another object is to provide in a cooling device a novel means of pneumatic agitation. A more specific phase of this object is to provide an air circulating pump operable for supplying air for a predetermined period of time.

Another object is the provision of an air pump particularly adapted to circulate air to a cooling device.

The above defined objects and others, which will be apparent from the detailed description to follow, are obtained by a milk cooling tank and a refrigerating unit, and certain novel construction and arrangement of parts associated therewith. The refrigerating coils have been arranged in the tank spaced from the walls thereof to form an ice bank during stand-by operation of the machine when the refrigerating load is small. A perforated pipe including in some cases a particular type of baffle for directing the air jets is arranged at the bottom of the tank, to provide a current of air for sweeping the walls of the ice bank, preventing the insulating effect of a stagnant liquid film adjacent the ice. To provide an air supply for a predetermined length of time, a particular type of air pump, old in the art but new in an application of this type, is driven directly off the compressor motor of the refrigerating unit. The pump is of a rotating vane, liquid seal type. The construction of the pump has been worked out in such a manner that the amount of time required to atomize and otherwise entrain a certain amount of liquid is a known factor. It is, therefore, evident that, by placing a certain amount of liquid in the pump, it will operate for a given length of time. The liquid seal is then broken and the pump merely rotates without any air forcing action.

A device constructed to incorporate the features of the invention and to attain the objects above set forth is shown in the drawings, in which:

Figure 3 is an end elevation of the air circulating pump shown as a part of the refrigerating unit in Figures 1 and 2;

Figure 4 is a section taken on the line 4—4 of Figure 3, the compressor motor to which the air pump is connected being shown in side elevation;

Figure 8 is an end elevation of the pump inlet and outlet plate from the inner side thereof;

Figure 9 is an end elevation of the pump inlet and outlet plate taken from the outer side; and, Figure 10 is a bottom plan view of the plate shown in Figures 8 and 9.

Figure 1:
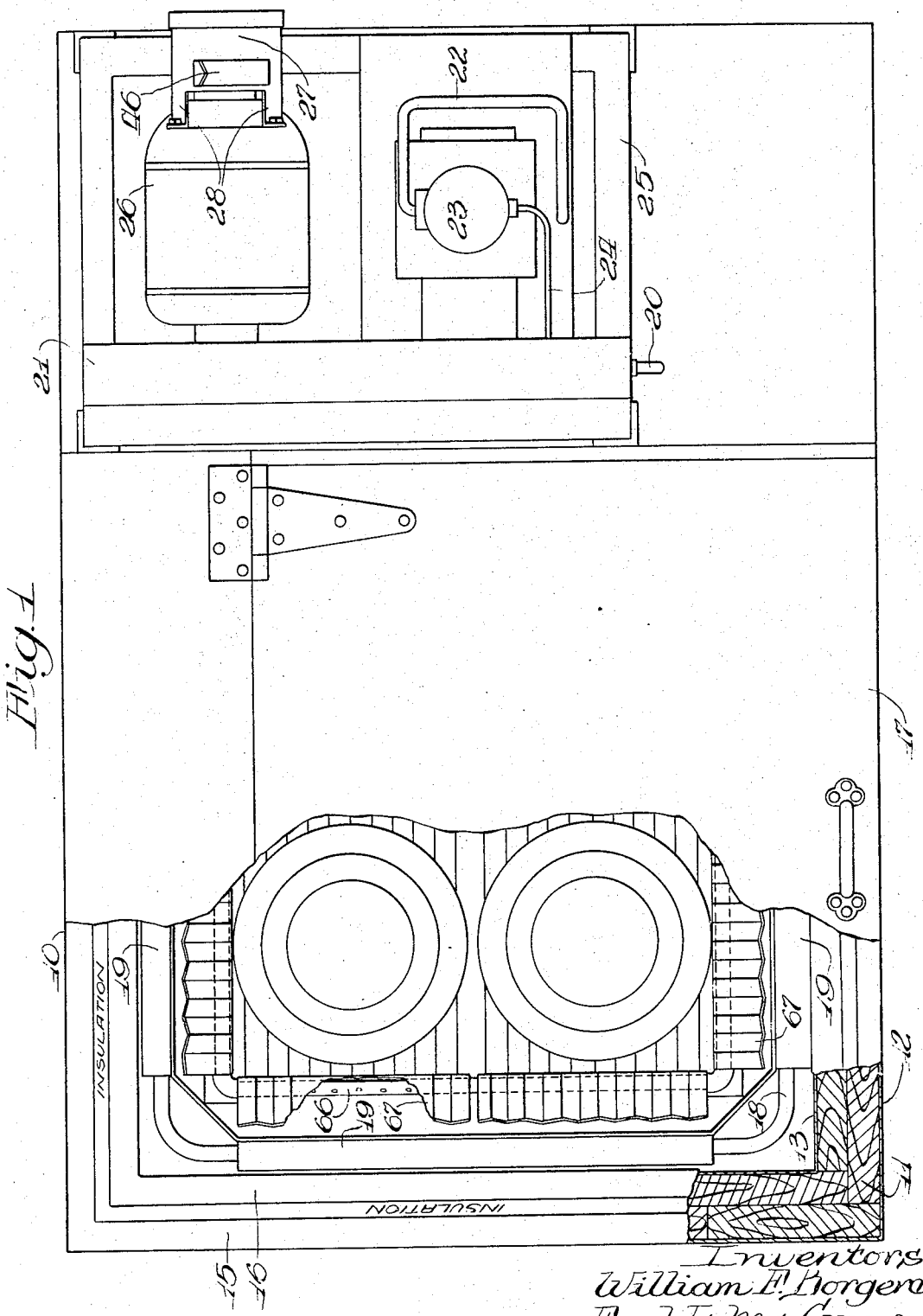
Figure 1 is a top plan view of a milk cooling cabinet with a refrigerating unit mounted at one end, the top of the cabinet being broken away at the other end to show the interior thereof and the construction of the insulating wall.

The milk cabinet used in this device may be of any conventional construction. As shown, the cabinet 10 is constructed of a wall 11 of insulating blocks, an outer metal casing 12, and an inner metal lining 13. Angle bars 14 along the bottom of the cabinet form supporting means therefor. It will be noted that at the top of the casing, outer angle bars 15 and inner angle bars 16 around the cover opening have their adjacent top edges spaced apart to provide a non-metallic insulating section to minimize the conduction of heat. A cover 17 encased in metal is hinged to the top of the casing. It is to be understood that the best insulating construction obtainable is used for cabinets of this type.

A continuous refrigerating coil 18 is arranged around the tank in slightly spaced relation from the walls and with the upper coil at a level normally below the level of the liquid in the tank when it contains no cans. The adjacent turns of said coil are positioned vertically above each other and the complete coil is held in position by a plurality of vertical standards 19, to which the turns of the coil are secured in any suitable manner. One end of the coil connects with a conduit 20 connected with a condenser 21 of the refrigerating unit. The other end of the coil connects with a conduit 22 leading to the intake of the cylinder of a compressor 23. A conduit 24 leading from the compressor to the condenser 21 completes the refrigeration cycle. These elements and other elements, such as expansion valves and the like, making up a refrigeration cycle of this type, have not been illustrated and described, as they may be conventional in construction, as well known in the art.

The compressor 23 is a part of a refrigerating unit mounted on a base 25 positioned on top of the cabinet 10 at one end thereof. Said compressor is driven by an electric motor 26.

At one end of the motor 26, a pump housing 27 is rigidly secured by a plurality of integral extensions 28 bolted to the motor frame. The pump housing 27 is formed as a casting cored out to accommodate a pump impeller 29 and other passages forming the pump unit.

Figure 7:
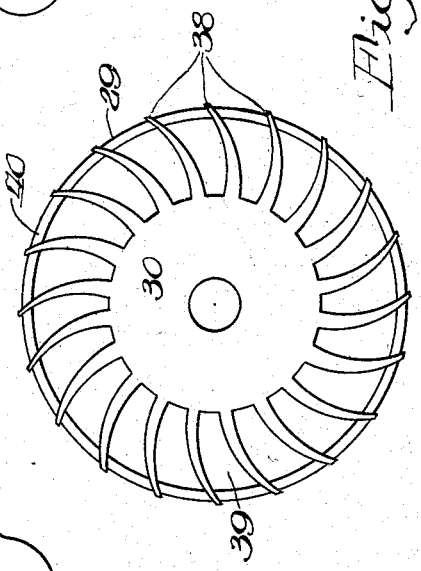
Figure 7 is an end elevation of the outer end of the pump impeller.
Figure 5:
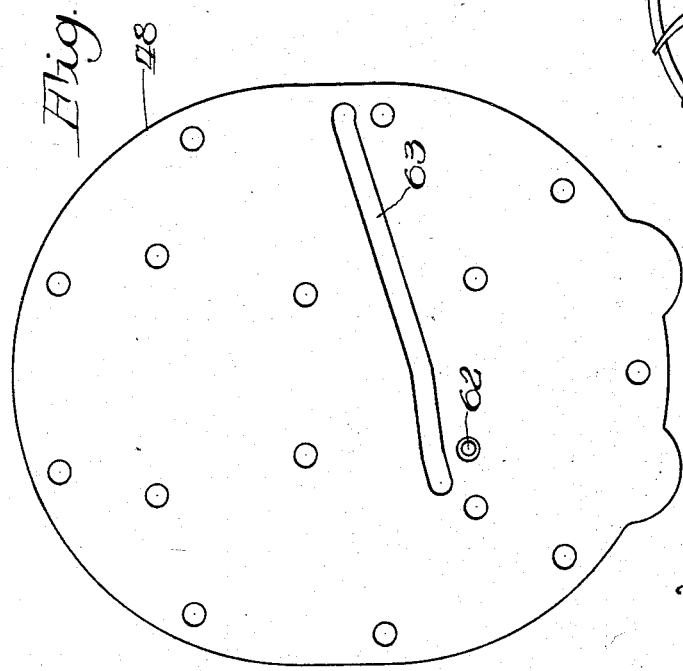
Figure 5 is an end elevation of the inside of the pump housing cover plate.

The impeller 29, as shown in Figure 7, is provided with a center portion 30 formed with an axial bore by which the impeller is secured on an extension 31 of the motor shaft. Said shaft extends through an opening 32 in the pump housing without contacting the housing. A sealing member 33, formed with an annular channel to prevent the escape of liquid, is mounted on the housing wall within the housing around the shaft 31 out of contact therewith. A cup-shaped member 34 secured co-axially with the impeller 29 around the shaft 31 extends in overlapping relation with respect to the sealing member 33 and is provided with an outwardly extending flange to throw liquid outwardly into a receiving chamber formed by a flanged member 35 fitted in an annular recess formed in the housing wall. From the chamber formed by this member liquid drains through a conduit 36 into a nozzle member 37, which functions as will be hereinafter described.

The impeller 29 around the central portion 30 is provided with a plurality of vanes 38 shaped to effectively form an air pump in the particular construction in which it is incorporated. At one end, the impeller is provided with an annular flange 39 sealing the space between the vanes and forming thereby compartments in combination with the retaining wall at the other end of the vanes, to be hereinafter described.

An inwardly projecting flange 40 terminates in alignment with an inwardly directing flange 41 formed on the housing wall to cooperatively form a part of the liquid seal. The outer side of the flange, or wall, 39 is provided with a series of annular ridges 42, which cooperate in mating relation with a plurality of similar ridges 43 on the housing wall to form a labyrinth sealing passage between the impeller end wall and the housing wall.

Figure 6:
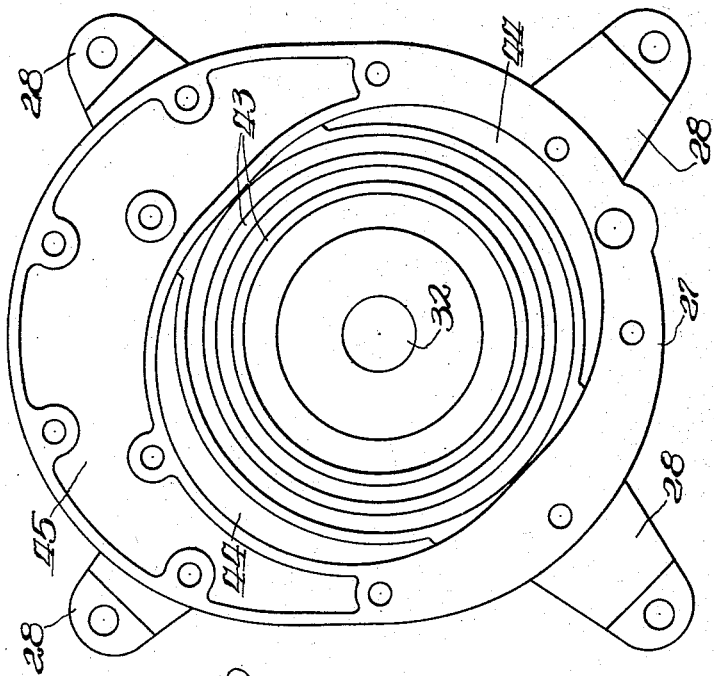
Figure 6 is an end elevation of the inside of the pump housing.

As shown in Figure 6, the housing 27 is provided with an impeller chamber somewhat elliptical in cross section whereby a pair of crescent-shaped chambers 44 are formed at diametrically opposite locations around the impeller. This pump is being described in detail, as it contains certain novel features of construction particularly adapted for its use in the device of the invention. For a more complete description, however, of a pump of this nature and of its mode of operation, the Nash Patent No. 1,091,529, March 31, 1914, is referred to. Figure 7 of this patent shows a two-compartment pump very similar in its general construction to that shown and herein described.

As best shown in Figure 6, a crescent-shaped water compartment 45 is formed around the upper side of the pump housing 27 above the impeller compartment. A filling plug 46 provides means for filling the compartment with liquid to the desired level.

A plate 47, having the same outside shape as the housing 27, is fitted over the open face of said housing opposite the end wall. As shown in Figures 8 and 9, said plate is provided with a plurality of recesses forming conduits in combination with the housing 27 and the cover plate 48, which is fitted over the plate 47, suitable gaskets being utilized between the cover plate and the plate 47 and between the plate 47 and the housing 27. The plate 47 is provided at its bottom edge with an air intake conduit 49 provided with an orifice 49' used for starting, as will be hereinafter described. The conduit 49 communicates with a recess, forming a conduit 50. Said conduit communicates through an opening 51 through the plate with the impeller adjacent the central portion 30 and through a second opening 52 with the impeller at a diametrically located point. The openings 51 and 52 are joined by recesses formed in the plate 47. An outlet conduit 53 at the lower edge of the plate 47 communicates by means of a conduit 54 formed by a recess in the plate 47 with an opening 55 extending through the plate. Said opening places the conduit 54 in communication with the compartment 45 in the top of the pump housing. It will be noted that the opening 55 is at the uppermost point in said compartment. An opening 56, somewhat lower vertically than the opening 55, forms a means of communication between the compartment 45 and branch conduits 57 formed by recesses in the plate 47. Said conduits, which form the means for discharging air from the pump chamber, communicate therewith through diametrically positioned openings 58.

The nozzle member 37, previously described as conducting water from the liquid seal, extends into the inlet conduit 50, being formed with an end portion to produce somewhat of a suction effect, whereby liquid delivered therefrom is entrained with the air and is drained into the inlet side of the pump impeller. An opening 59 formed at the lowermost point of the impeller chamber communicates also with the conduit 36, whereby liquid draining therefrom passes through the nozzle member 37. During normal operation of the pump, the liquid escaping through the opening 59 is entrained in the air stream and returned to the pump chamber.

A conduit 60 formed by a recess in the plate 47 communicates through an opening 61 with the lowermost point in the liquid chamber 45 at one side thereof. Said conduit delivers the liquid back into the inlet passage 50. A valve 62, extending outwardly through the cover plate 48, provides means for regulating the flow of liquid through the conduit 60.

A conduit 63, formed by a recess in the cover plate 48, communicates through an opening 64 extending through the plate 47 with the water chamber 45 at the end opposite the communication of the conduit 60. At its other end the conduit 63 communicates with the conduit 60 ahead of the orifice 62, whereby said orifice regulates the flow of liquid from both ends of the compartment 45.

Figure 2:
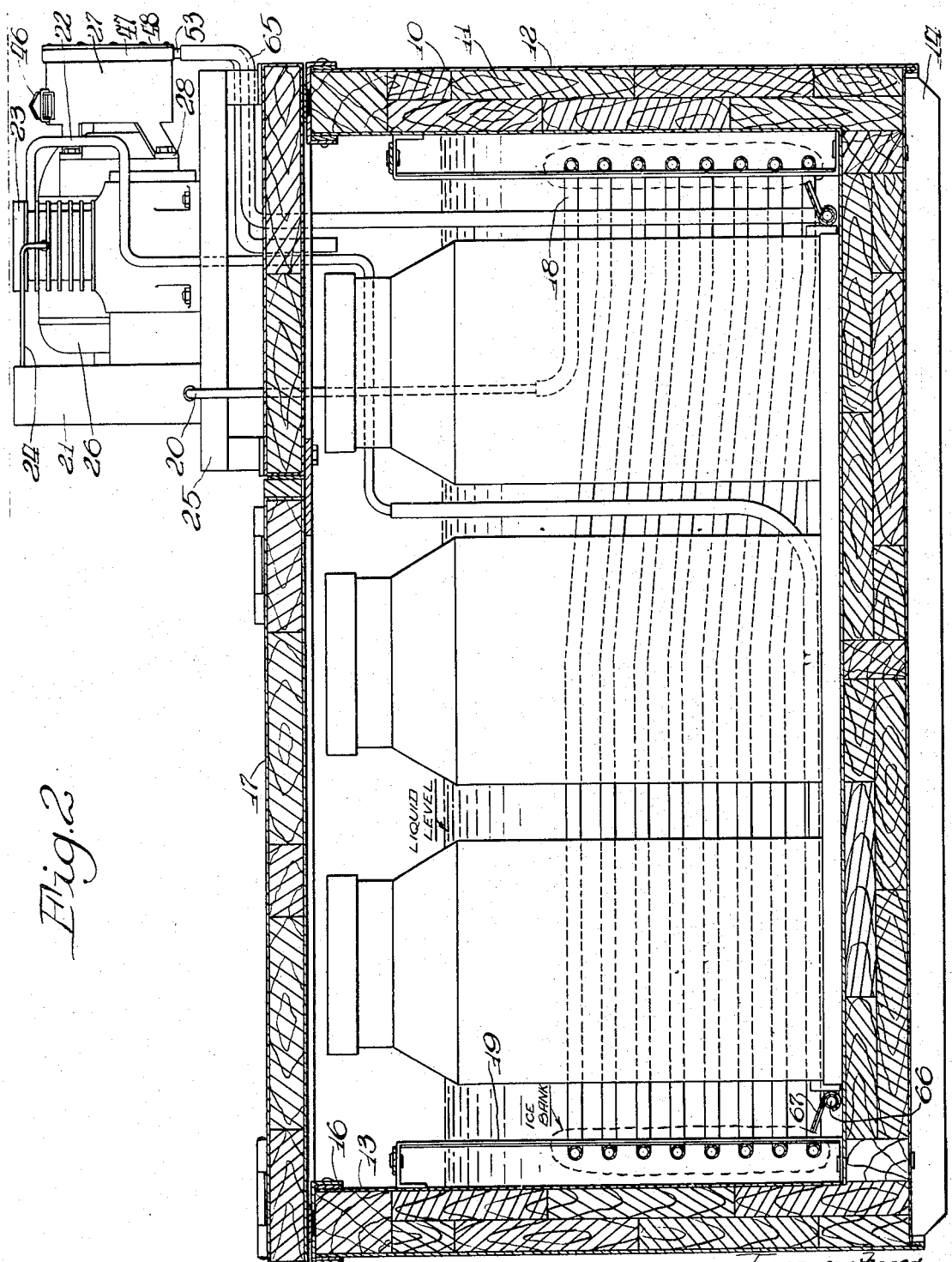
Figure 2 is a vertical, longitudinal section of the device as shown in Figure 1, with the refrigerating unit shown in side elevation.

The outlet conduit 53 of the air pump is connected with a conduit 65 leading to a perforated pipe 66 placed around the bottom of the cabinet 10. Said perforated coil is positioned inwardly a substantial distance from the refrigerating coil 18, the perforations being on the side of the coil adjacent the refrigerating coil. Baffle members 67 have end portions radially bent around the pipe 66 and a deflecting flange extending upwardly and outwardly toward the refrigerating coil 18. The flanges of said members may be corrugated to assure distribution of the air lengthwise of the flange. The length and positioning of the flanged portion of said members depend upon the spacing of the coil 66 from the refrigerating coil 18 and upon the nature of the ice bank formed around the refrigerating coil in a normal condition of operation. An ice bank has been indicated at the ends of the cabinet in Figure 2 to illustrate the functioning of the device. The liquid level has also been indicated at the top of its normal level, said liquid not being otherwise indicated because of its confusing effect upon the drawings.

In the operation of a device as above described, the refrigerating unit is provided with the conventional automatic controls as used in household refrigeration. During stand-by operation, the controls for the machine, which are not shown in this application, are regulated so that an ice bank of predetermined thickness is formed around the refrigerating coil 18 before the refrigeration is cut off. There is no liquid in the pipe during this period of operation, and the impeller rotates freely therein with no friction except the very slight amount of air drag upon the impeller.

When milk cans are put into the cabinet, this being shown in the illustrated form, the temperature of the liquid immediately rises and the refrigerating unit is operated at full capacity. With a small unit of an economical size, a considerable period of time, much in excess of the desired time, would be required to extract sufficient heat from the cans of milk to reduce the temperature to the desired point. However, in addition to the refrigerating capacity of the unit, refrigeration has been stored up, so to speak, in the ice bank. The problem, then, is to rapidly transfer the heat from the cans to the ice bank to obtain the latent heat required in melting the ice.

When the milk cans are placed in the cabinet, the cock 49' is closed and liquid is poured into the chamber 45, filling said chamber up to the filler opening. In the commercial embodiment of this device, the chamber 45 is constructed of such a size as to contain sufficient liquid for the desired period of operation,—generally about one hour. The liquid fills the impeller chamber and seals the ends of the impeller vanes between the vanes and the chamber. The cock 49' is then opened to provide an air inlet to the pump casing. A pump action immediately begins, acting on the principle of the previously mentioned Nash patent. Air is drawn in through the conduit 50 and is discharged along with a certain amount of water through the discharge conduit 57 and the opening 56 into the chamber 45 above the liquid level therein. A large amount of the water entrained with the air, due to agitation in the impeller chamber, drops out in the chamber 45. A certain amount, however, passes on with the air through the outlet conduit 53 into the perforated coil 66.

Air discharged from the perforated coil 66 is delivered over the baffles 67 along the surface of the ice bank. The air carries along the liquid with it, sweeping the walls of the ice bank, and rapidly melting the ice. The cool liquid circulates around the cans and down to the bottom of the cabinet. In this manner the bubbling air not only removes the insulating layer of warm water from the surface of the ice, but also maintains a circulation around the cans. It has been found that an ice bank of substantial thickness can be melted in about an hour's time and that the milk in the cans can be cooled to the desired temperature in the same length of time.

The liquid in the pump chamber is gradually depleted, as above described. After a certain amount of liquid has been removed in the course of operation, the liquid seal is broken between the ends of the vanes and the pump chamber. As soon as this happens, even in an irregular manner, the inlet suction is reduced. Water normally entrained from the nozzle member 37 flows downwardly through the air intake into the tank. The escape of liquid from the pump chamber through the opening 59 hastens the unsealing action, once it has started, and completely breaks the seal after a short period of such an irregular type of operation. Liquid from the chamber 45 drains through the conduit 60 into the inlet conduit 50 and back into the cooling cabinet, and through the conduit 65. The liquid also drains from the pump chamber, as previously described. The impeller is then free to rotate without any appreciable friction and continues in operation whenever the motor is in operation, without, however, the pumping of any air to the perforated coil 66.

It will be understood, as above described, that the cooling device as constructed is substantially automatic in operation to rapidly cool to a predetermined temperature within a short period of time and to subsequently supply refrigeration at a normal rate. Also the device is effective during stand-by periods of operation, when incorporated with conventional controlling mechanisms, to store up accumulated refrigeration in the form of an ice bank for performing subsequently its rapid cooling operation. By such a construction and by its operation as above set forth, a small capacity refrigerating unit is effective to accomplish for a short time a heavy refrigeration job. Another important feature of the invention is the freedom from agitating means in the milk itself, which is always undesirable, and the provision of agitating means free from wearing parts and substantially automatic in operation.

It is to be understood that applicant has shown and described only a preferred embodiment of his novel cooling device and means for its operation, and that he claims as his invention all modifications falling within the scope of the appended claims.

What is claimed is:

1. A cooling device for cooling material at a rapid rate comprising a water tank, cooling coils positioned in said tank, means for supplying a refrigerant to said coils during a stand-by period of operation with heat removing capacity in excess of the heat transferred thereto whereby ice is formed around the coils, means for increasing the rate of refrigerating effect comprising gas distributing means positioned in the tank below liquid level and means for forcing a gas through said means whereby the water is agitated along the surface of the ice thereby increasing the rate of heat transfer, and means associated with said forcing means for stopping the supplying of gas after a predetermined period.

2. A cooling device for cooling material at a rapid rate comprising a tank for containing water, refrigerating coils positioned in said tank, a refrigerating device for supplying a cooling medium to said coils for forming ice therearound during one period of operation, a perforated air supply pipe positioned in the tank to agitate the water adjacent the ice around the coils during a period of rapid cooling of material in the tank, and means for supplying air to said pipe during said period, said means being associated with means to automatically discontinue the supply of air after a predetermined period of rapid cooling.

3. A cooling device comprising a tank for containing water, refrigerating coils positioned in said tank, a refrigerating device for supplying a cooling medium to said coils for forming ice therearound, a perforated air supply pipe positioned in the tank to agitate the water adjacent the coils, and means for supplying air to said pipe for a predetermined period, said means being operable to automatically cease to supply air after said period.

4. A cooling device comprising a tank for containing water, refrigerating coils positioned in said tank, a refrigerating device for supplying a cooling medium to said coils for forming ice therearound, a perforated air supply pipe positioned in the tank to agitate the water adjacent the coils, means for supplying air to said pipe for a predetermined period consisting of a casing having an eccentric chamber therein, an impeller mounted in said chamber, air inlet and outlet means to said chamber, means to supply liquid to the chamber to seal the impeller with respect to the casing, said chamber being formed to hold a given quantity of liquid, said quantity being predetermined to give a predetermined period of operation prior to its being depleted by evaporation and entrained by the air stream, and means to drain the liquid from the casing when the seal is broken by depletion of the liquid.

5. A cooling device which comprises a water receptacle, means for supplying a cooling medium in heat exchange relationship with said water, said means being effective to solidify a portion of the water at certain periods of operation whereby extra refrigeration is obtained for a subsequent period of operation, means for agitating the water adjacent the solidified portion for a given period of time during said subsequent period of operation to increase the rate of heat transfer, and means for automatically stopping the agitation after a predetermined period of rapid cooling.

6. A cooling device comprising a tank for containing water, refrigerating coils positioned around said tank in substantially vertical planes, means for supplying a cooling medium to said coils, said means having sufficient capacity to form a bank of ice on the coils during a stand-by period of operation, perforated air supply pipes located adjacent the bottom of the tank substantially beneath the areas in which the ice banks are formed, a pump for supplying air under pressure to said pipes consisting of a casing having an eccentric chamber therein, a rotatable impeller mounted in said chamber, a shaft extending from the impeller through one wall of the casing, an air inlet to one area of the face of the impeller, and an air outlet from another portion of the face of the impeller, said outlet connecting with the air supply pipes in the tank, and means for supplying liquid to said casing for sealing the space between the impeller and the surrounding compartment whereby air circulation is obtained, said chamber being formed to hold a quantity of liquid predetermined by the loss due to agitation and evaporation to obtain a predetermined time period of operation of the pump.

7. A cooling device particularly adapted for rapidly cooling a substance to a predetermined temperature comprising a tank for containing water, refrigerating coils positioned around said tank in substantially vertical planes, a compressor expander refrigerating device for supplying a cooling medium to said coils, said device having sufficient capacity to form a bank of ice on the coils during a stand-by period of operation, perforated air supply pipes located adjacent the bottom of the tank substantially beneath the areas in which the ice banks are formed, means for supplying air under pressure to said pipes, said means consisting of an air pump driven by the same source of power as the refrigerating device, said pump consisting of a casing having an eccentric chamber therein, a rotatable impeller mounted in said chamber, a shaft extending from the impeller through one wall of the casing, a labyrinth oilless seal between the shaft and the casing wall, an air inlet to one area of the face of the impeller, an air outlet from another portion of the face of the impeller, said outlet connecting with the air supply pipes in the tank and said inlet connecting with the tank above the liquid level therein, means for supplying liquid to said casing for sealing the space between the impeller and the surrounding compartment whereby air circulation is obtained, said chamber being formed to hold a quantity of liquid predetermined by the loss due to agitation and evaporation to obtain a predetermined time period of operation of the pump, and means for draining the residual liquid from the pump into the tank when the seal is broken by depletion of the liquid.

8. A cooling device comprising a tank for containing water, cooling coils positioned in said tank below the normal liquid level, means for passing a cooling medium through said coils sufficient to form an ice bank there-around during certain periods of operation, and means for increasing the rate of heat transfer to the liquid during subsequent periods of operation including means for supplying agitating gases beneath the liquid level adjacent the ice bank, said means comprising a perforated pipe positioned below the ice bank and a deflector loosely pivoted adjacent the pipe and terminating beneath the ice bank.

WILLIAM F. BORGERD.
FRED L. McCUNE.
CHARLES A. UHEREK.